(12) United States Patent
Kakimoto (10) Patent No.: US 11,002,940 B2
(45) Date of Patent: May 11, 2021

(54) CONTROL APPARATUS, OPTICAL APPARATUS, AND CONTROL METHOD FOR OPTICAL APPARATUS

(71) Applicant: CANON KABUSHIKI KAISHA, Tokyo (JP)

(72) Inventor: Takeshi Kakimoto, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 170 days.

(21) Appl. No.: 16/372,872

(22) Filed: Apr. 2, 2019

(65) Prior Publication Data
US 2019/0310440 A1    Oct. 10, 2019

(30) Foreign Application Priority Data

Apr. 4, 2018    (JP) .......................... JP2018-072669

(51) Int. Cl.
     *G02B 7/09*      (2021.01)
     *G03B 5/00*      (2021.01)
     (Continued)

(52) U.S. Cl.
     CPC ............... *G02B 7/09* (2013.01); *G03B 5/00* (2013.01); *G03B 13/34* (2013.01); *G03B 13/36* (2013.01);
     (Continued)

(58) Field of Classification Search
CPC .. G03B 5/00; G03B 17/14; G03B 2205/0046; G03B 13/34; G03B 13/36; G03B 13/32;
(Continued)

(56) References Cited

U.S. PATENT DOCUMENTS 6,348,948 B1 *    2/2002    Kyuma ............... H04N 5/23209
                                                                 348/240.1
6,633,729 B1 *   10/2003    Yoshikawa ............ G03B 17/00
                                                                     396/76
(Continued)

FOREIGN PATENT DOCUMENTS

CN            101034196 A      9/2007
CN            102202170 A      9/2011
(Continued)

OTHER PUBLICATIONS

Extended European Search Report issued by the European Patent Office dated Aug. 12, 2019 in corresponding European Patent Application No. 19166685.8.

(Continued)

*Primary Examiner* — William R Alexander
(74) *Attorney, Agent, or Firm* — Carter, Deluca & Farrell LLP (57) ABSTRACT

A control apparatus is used for an optical apparatus that includes a movable optical element, an operation ring that is endlessly rotatable, and a driver configured to drive the optical element. The control apparatus includes an operation start detector configured to detect a start of an operation of the operation ring, and a drive controller configured to control the driver. The drive controller sets a rotational position of the operation ring and the position of the optical element to a ring reference position and an optical element reference position respectively when the start of the operation of the operation ring is detected. The drive controller controls the driver in accordance with a drive amount of the optical element calculated with an operational amount of the operation ring from the ring reference position, and the optical element reference position.

13 Claims, 4 Drawing Sheets

(51) Int. Cl.
    *G03B 13/36*     (2021.01)
    *G03B 13/34*     (2021.01)
    *H04N 5/232*     (2006.01)
    *G02B 7/08*     (2021.01)
    *G03B 17/14*     (2021.01)

(52) U.S. Cl.
    CPC ............. *H04N 5/232* (2013.01); *G02B 7/08* (2013.01); *G03B 17/14* (2013.01); *G03B 2205/0046* (2013.01)

(58) Field of Classification Search
    CPC . H04N 5/232; G02B 7/09; G02B 7/04; G02B 7/02; G02B 7/08
    USPC .......................................................... 359/696
    See application file for complete search history.

(56) References Cited

U.S. PATENT DOCUMENTS

| | | | | |
|---|---|---|---|---|
| 7,151,570 | B2* | 12/2006 | Kaneda | G02B 7/102 348/360 |
| 8,817,169 | B2* | 8/2014 | Kawada | G02B 7/102 348/352 |
| 10,230,896 | B2* | 3/2019 | Ohara | G03B 17/56 |
| 10,371,923 | B2* | 8/2019 | Komiyama | G02B 7/282 |
| 2002/0101531 | A1* | 8/2002 | Kaneda | H04N 5/23209 348/347 |
| 2002/0109784 | A1* | 8/2002 | Suda | H04N 5/23212 348/345 |
| 2003/0030741 | A1* | 2/2003 | Ohta | G02B 7/102 348/345 |
| 2005/0094023 | A1* | 5/2005 | Natsume | H04N 5/23212 348/345 |
| 2008/0247741 | A1* | 10/2008 | Yasuda | H04N 5/23212 396/104 |
| 2009/0040359 | A1* | 2/2009 | Tanaka | H04N 5/222 348/335 |
| 2013/0093937 | A1* | 4/2013 | Kawai | H04N 5/23245 348/345 |
| 2014/0029121 | A1 | 1/2014 | Mitarai | |
| 2016/0119533 | A1 | 4/2016 | Okawa et al. | |
| 2017/0357078 | A1* | 12/2017 | Komiyama | G02B 7/14 |

FOREIGN PATENT DOCUMENTS

| | | |
|---|---|---|
| CN | 103460102 A | 12/2013 |
| CN | 107076962 A | 8/2017 |
| JP | 2007272219 A | 10/2007 |
| JP | 2015011315 A | 1/2015 |
| JP | 2016191908 A | 11/2016 |

OTHER PUBLICATIONS

Chinese Office Action dated Dec. 2, 2020, for Corresponding Chinese Application No. 201910270063.1.

\* cited by examiner

CONTROL APPARATUS, OPTICAL APPARATUS, AND CONTROL METHOD FOR OPTICAL APPARATUS

BACKGROUND OF THE INVENTION

Field of the Invention

The present invention relates to a control over driving of an optical element in accordance with an operation of a manual operation ring.

Description of the Related Art

One of the above optical apparatuses detects a rotational operational amount of an electronic ring as a manual operation ring through a sensor and drives an optical element, such as a focus lens, by a drive amount converted from the rotational operational amount. Using the electronic ring is likely to cause an error in an actual drive amount of the optical element in comparison with the rotational operational amount of the electronic ring, due to an intervention of an electrical control between the manual operation and driving of the optical element. For example, even when the electronic ring for the focusing operation is once operated and returned to the pre-operation rotational position, the position of the focus lens does not return to the pre-operation position and intuitive focusing by the user becomes difficult.

U.S. Patent Application, Publication No. 2016/0119533 discloses an optical apparatus that drives a focus lens so as to obtain an in-focus state for an object distance corresponding to a rotational position of an electronic ring by assigning the object distance at which the in-focus state is obtained for each rotational position of the electronic ring.

The optical apparatus disclosed in U.S. Patent Application, Publication No. 2016/0119533 needs to limit the rotatable angle of the electronic ring in order to associate the rotational position of the electronic ring with the object distance at which the in-focus state is obtained. Thus, the configuration disclosed in U.S. Patent Application, Publication No. 2016/0119533 is inapplicable where the rotatable angle of the electronic ring has no limitation or the electronic ring is endlessly rotatable.

SUMMARY OF THE INVENTION

The present invention provides a control apparatus, an optical apparatus, and a control method for an optical apparatus, each of which can improve a driving accuracy of an optical element for its rotational position with an endlessly rotatable electronic ring.

A control apparatus according to one aspect of the present invention used for an optical apparatus that includes a movable optical element, an operation ring that is endlessly rotatable, and a driver configured to drive the optical element includes an operation start detector configured to detect a start of an operation of the operation ring, and a drive controller configured to control the driver. The drive controller sets a rotational position of the operation ring and the position of the optical element to a ring reference position and an optical element reference position respectively when the start of the operation of the operation ring is detected. The drive controller controls the driver in accordance with a drive amount of the optical element calculated with an operational amount of the operation ring from the ring reference position, and the optical element reference position.

An optical apparatus according to another aspect of the present invention includes a movable optical element, an operation ring that is endlessly rotatable, a driver configured to drive the optical element, and the above control apparatus.

An imaging apparatus according to another aspect of the present invention to which an optical apparatus is detachably attached, the optical apparatus including a movable optical element, an operation ring that is endlessly rotatable, and a driver configured to drive the optical element includes an image sensor configured to convert an object image into an electric signal, and the above control apparatus.

A control method according to another aspect of the present invention for an optical apparatus that includes a movable optical element, an operation ring that is endlessly rotatable, and a driver configured to drive the optical element includes the steps of acquiring a rotational position of the operation ring and a position of the optical element when a start of an operation of the operation ring is detected, setting an acquired rotational position of the operation ring and an acquired position of the optical element to the ring reference position and the optical element reference position respectively, acquiring an operational amount of the operation ring from the ring reference position after the setting step, calculating a drive amount of the optical element using the operational amount and the optical element reference position; and controlling the optical element based on a calculated drive amount of the optical element.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1:
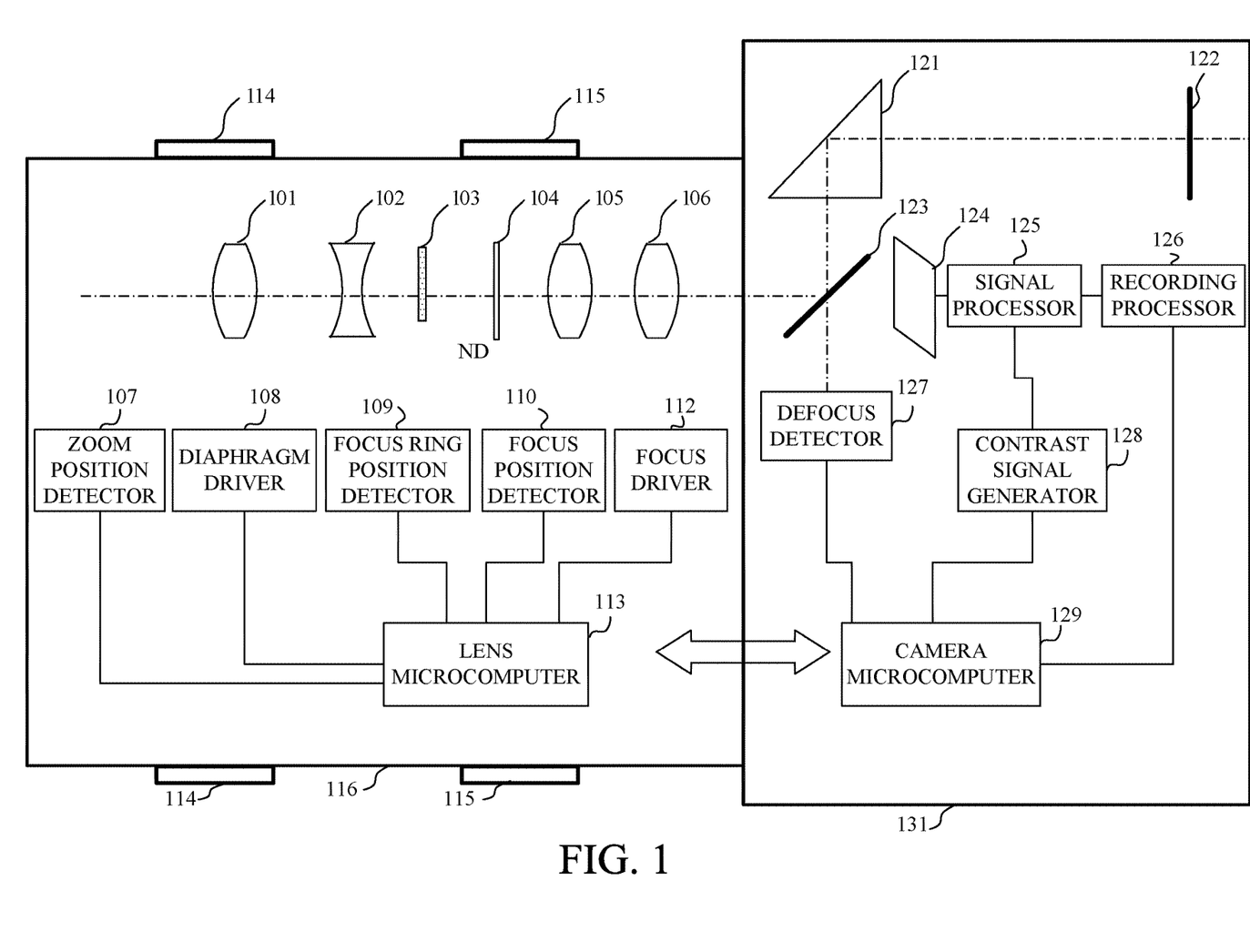
FIG. 1 is a block diagram illustrating a configuration of a lens interchangeable type camera system according to a first embodiment of the present invention.

FIG. 1 illustrates a configuration of a camera system that includes an interchangeable lens 116 as an optical apparatus according to a first embodiment of the present invention, and a camera body 131 to which the interchangeable lens 116 is detachably attached.

Light from an unillustrated object enters an imaging optical system in the interchangeable lens 116. The imaging optical system includes a first lens 101, a zoom lens 102, a diaphragm (aperture stop) 103, an ND filter 104, a focus lens 105 as an optical element, and a fourth lens 106. The zoom lens 102 is movable in the optical axis direction for zooming. The focus lens 105 is movable in the optical axis direction in focusing. The diaphragm 103 controls a light amount by changing an aperture diameter. The ND filter 104 attenuates the light amount.

The light having passed through the imaging optical system is reflected by a main mirror 123 in the camera body 131, is guided to a pentagonal prism 121, passes through a viewfinder 122, and reaches an unillustrated eye of a user. Thereby, the user can observe the object image.

Part of the main mirror 123 is formed as a half-mirror, and the light transmitted through it is guided to a defocus detector 127 by an unillustrated sub-mirror. The defocus detector 127 performs a focus detection by the phase difference detection method and calculates a defocus amount of the imaging optical system from the object. The calculated defocus amount is output to a camera microcomputer 129.

When the main mirror 123 and the sub-mirror move to an up position outside of the optical path of the imaging optical system where they retreat from the illustrated down position, the light from the imaging optical system forms an object image on an image sensor 124. The image sensor 124 photoelectrically converts an object image and outputs an analog image signal as an electric signal to a signal processor 125. The signal processor 125 performs signal processing, such as a signal amplification and a digitalization, for the analog image signal to generate a digital image signal (digital information of a captured image), and further performs video processing, such as color correction and white balancing, for the digital image signal to generate a video signal. The video signal is recorded on the recording medium by a recording processor 126 or displayed on an unillustrated electronic viewfinder.

The digital image signal (or video signal) generated by the signal processor 125 is also output to a contrast signal generator 128. The contrast signal generator 128 generates a contrast evaluation value signal indicating the contrast state of the object image (image signal) by using a high-frequency component contained in the digital image signal. The contrast evaluation value signal is output to a camera microcomputer 129 for use in the focus detection by the contrast detection method. The image sensor 124 may perform the focus detection by the phase difference detection method.

The camera microcomputer 129 mutually communicates with a lens microcomputer 113 in the interchangeable lens 116 at a predetermined communication period or as required. The camera microcomputer 129 transmits a lens control command, such as a focus driving command, an optical information transmitting command, and a diaphragm driving command, to the lens microcomputer 113. The lens microcomputer 113 transmits various optical information of the interchangeable lens 116 to the camera microcomputer 129. The optical information contains the focus position, the focus sensitivity, the focal length (zoom position), the imaging distance, the object distance, the best focus correction value, the open F-value, the minimum F-value, and the moving amount of the focus lens per one driving pulse. These pieces of optical information are used when the camera microcomputer 129 performs the automatic exposure control, the automatic light control, and the automatic focus control.

The interchangeable lens 116 drives the diaphragm 103 such that the F-number (aperture value) is changed by a diaphragm driver 108 controlled by the lens microcomputer 113. The diaphragm driver 108 includes an actuator such as a stepping motor and VCM. The F-number (the position of the aperture blade) of the diaphragm 103 is detected by a sensor, such as a Hall element, and output to the lens microcomputer 113. The ND filter 104 can move in and out of the optical path by a user operation.

A zoom operation ring 114 can be rotated by the user. The interchangeable lens 116 has a mechanism that mechanically transmits the rotation of the zoom operation ring 114 to the zoom lens 102 and moves the zoom lens 102 in the optical axis direction in the imaging optical system. This configuration can provide manual zooming that changes the focal length of the imaging optical system. The zoom operation ring 114 has a rotation end on each of the telephoto side and the wide angle side.

A focusing operation ring 115 can also be rotated by the user. The focusing operation ring 115 is an electronic ring, and is not mechanically connected to the focus lens 105. The focusing operation ring 115 is an endlessly rotatable operation ring that has no rotational end neither on the infinite (or far) side nor on the short distance (or near) side. The rotational position (referred to as the ring position hereinafter) of the focusing operation ring 115 is detected by a focus ring position detector 109. The lens microcomputer 113 drives the focus lens 105 as the optical element in the optical axis direction by controlling the focus driver 110 based on the detected ring position.

The zoom position and the focus position as the positions of the zoom lens 102 and the focus lens 105 in the optical axis direction are detected by a zoom position detector 107 and a focus position detector 110 each including a sensor using a variable resistance or the like. The position detection result is output to the lens microcomputer 113.

In order to detect a change in the ring position, the lens microcomputer 113 acquires information on the ring position from the focus ring position detector 109 by polling processing. Then, the drive amount of the focus lens 105 corresponding to the change amount in the ring position from the last control timing to the current control timing is calculated. The control timing will be described later. In the following description, the change amount in the ring position from one point in time to another point in time will be referred to as a ring operational amount. The focus drive amount that is calculated will be referred to as a calculated focus drive amount.

Simply controlling driving of the focus lens 105 using this calculated focus drive amount may cause an error in the actual drive amount of the focus lens 105 (referred to as an actual focus drive amount hereinafter) from the ring operational amount.

Figure 2:
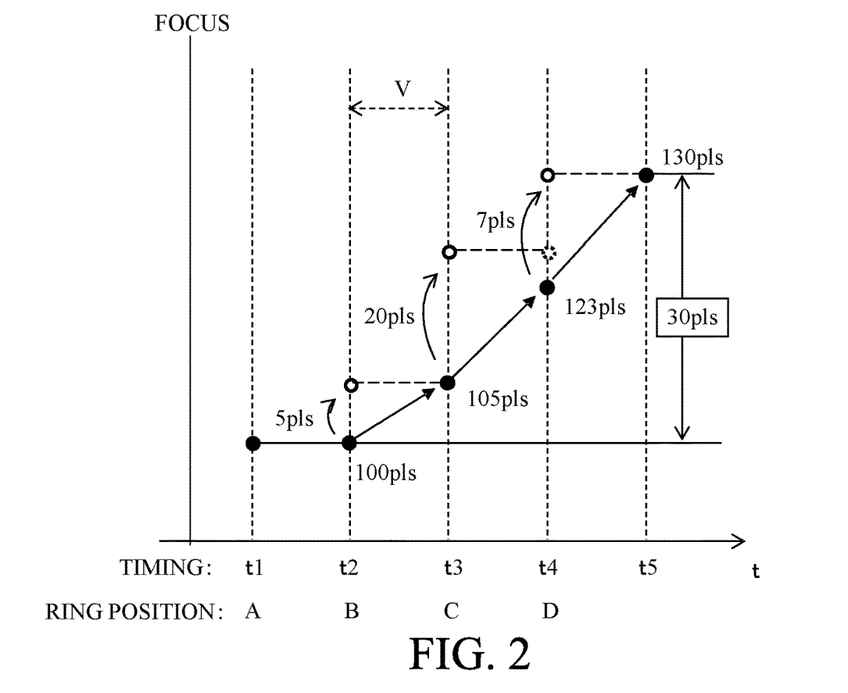
FIG. 2 explains an error in an actual drive amount of a focus lens to an operational amount of an operation ring.

FIG. 2 illustrates an error in the actual focus drive amount from the ring operational amount. The abscissa axis represents time and the ordinate axis represents a focus position. A plurality of vertical broken lines that intersect the time axis at a predetermined period (referred to as a control period hereinafter) v represent control timings t1 to t5 as timings for controlling driving of the focus lens in accordance with the ring operational amount. The ring position is detected, the calculated focus drive amount is calculated, and the target position for the focus position (referred to as a target focus position hereinafter) is set at each control timing. In this figure, the ring positions detected at the control timings t1 to t4 are designated by A, B, C, and D, respectively. The focus position detected at each control timing is represented by a black dot, and the target focus position set at each control timing is represented by a white dot. Assume that the focus position before the focusing operation ring is operated is the position of 100 pls (pulse).

At each control timing, the ring operational amount is obtained from a difference between the ring position detected at that point in time (current) and the ring position detected at the last control timing, and the calculated focus drive amount corresponding to the ring operational amount is calculated. Then, the target focus position is set by adding the calculated focus drive amount to the current focus position.

When the focusing operation ring is rotated at a high speed, etc., driving of the focus lens is later than the operation of the focusing operation ring and the current focus position may not reach the target focus position set at the last control timing. In FIG. 2, the focus position (123 pls) has not reached the target focus position (100+5+20=125 pls) at the control timing t4.

Even in this case, the calculated focus drive amount calculated from the ring operational amount is added to the current focus position, and the target focus position at the next control timing is set. In FIG. 2, the total ring operational amount (D-A: corresponding total calculated focus drive amount=32 pls) from the operation start time t1 to the operation end time t4 of the focusing operation ring shifts from the target focus position (130 pls) set at the control timing t5. As a result, an error (2 pls) occurs in the total actual focus drive amount (130−100=30 pls) relative to the total ring operational amount.

In order to reduce such errors, this embodiment provides a reference position for each of the ring position and the focus position, and calculates the calculated focus drive amount relative to the ring operational amount from the reference position of the ring position.

Figure 3:
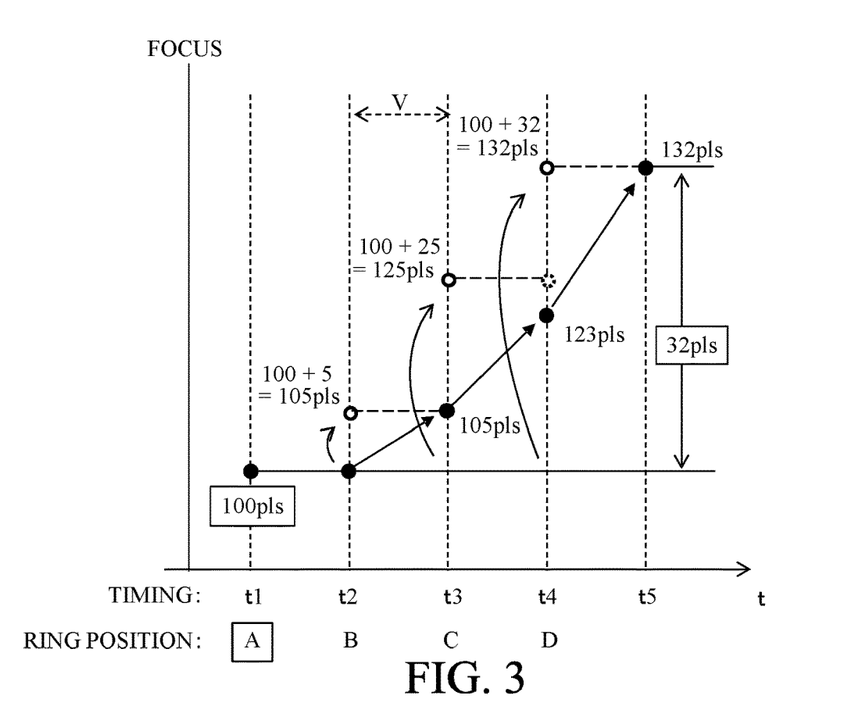
FIG. 3 explains a calculation of a focus drive amount according to the first embodiment.

FIG. 3 illustrates the calculated focus drive amount and the target focus position calculated by providing the reference position for each of the ring position and the focus position. Similar to FIG. 2, the abscissa axis represents time and the ordinate axis represents the focus position. A plurality of vertical broken lines that intersect with the time axis at a predetermined control period v represent control timings t1 to t5 which are timings for controlling driving of the focus lens in accordance with the ring operational amount. Even in FIG. 3, the ring positions detected at the control timings t1 to t4 are designated by A, B, C, and D, respectively. The focus position detected at each control timing is represented by a black dot, and the target focus position set at each control timing is represented by a white dot. The focus position before the focusing operation ring 115 is operated is set to the position of 100 pls.

The lens microcomputer 113 sets the ring position A at the time t1 when the operation of the focusing operation ring 115 starts to the ring reference position, and sets the focus position (100 pls) at that time to the focus reference position (optical element reference position). Then, at each control timing, the lens microcomputer 113 obtains the total ring operational amount up to now based on the difference between the ring reference position and the ring position detected at the control timing (current). The lens microcomputer 113 acquires the target focus drive amount (5, 25, 32 pls) corresponding to the total ring operational amount up to now. The target focus drive amount may be calculated by a function including the total ring operational amount as a variable or may be acquired by reading the data stored in an unillustrated memory correlated with the total ring operational amount.

The lens microcomputer 113 adds the obtained target focus drive amount to the focus reference position, and calculates (sets) the target focus position at the next control timing.

Then, the lens microcomputer 113 calculates the calculated focus drive amount based on the difference between the target focus position and the current focus position. Thereby, each ring operational amount from the ring reference position and the calculated focus drive amount from the focus reference position are one by one corresponded. Thus, even if the focus position (123 pls) has not reached the target focus position (125 ps) at the control timing t4 as illustrated in FIG. 3, the focus position reaches the target focus position (132 pls) at the drive control completion time t5 of the focus lens 105. In other words, the error of the total actual focus drive amount from the total ring operational amount is reduced.

As described above, the focusing operation ring 115 is endlessly rotatable and is not mechanically interlocked with the focus lens 105. When the interchangeable lens 116 receives an external force, such as impact, the focus lens 105 may move while the focusing operation ring 115 is maintained unrotated. Then, the correspondence relationship between the ring position and the focus position destroys. When the manual focusing is prohibited, such as during exposure, the focusing operation ring 115 can be rotated while the focus lens 105 is stopped and consequently the correspondence relationship between the ring position and the focusing position destroys.

When the focusing operation ring 115 is operated after the correspondence relationship between the ring position and the focus position destroys as described above, the focus drive amount is calculated so as to restore the destroyed correspondence relationship. Therefore, the focus lens 105 is abnormally driven relative to the operation of the focusing operation ring 115. In order to prevent such abnormal driving, this embodiment updates the ring reference position and the focus reference position at an appropriate timing.

Figure 4A:
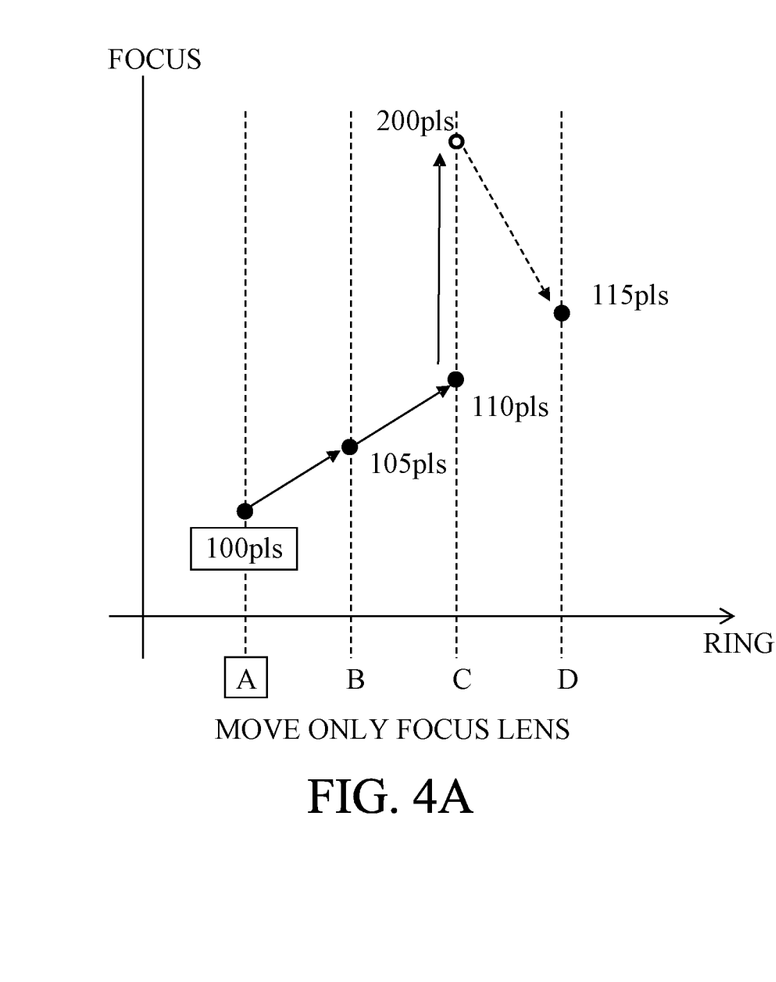
FIGS. 4A and 4B explain a broken correspondence relationship between a position of the operation ring and a position of the focus lens.
Figure 4B:
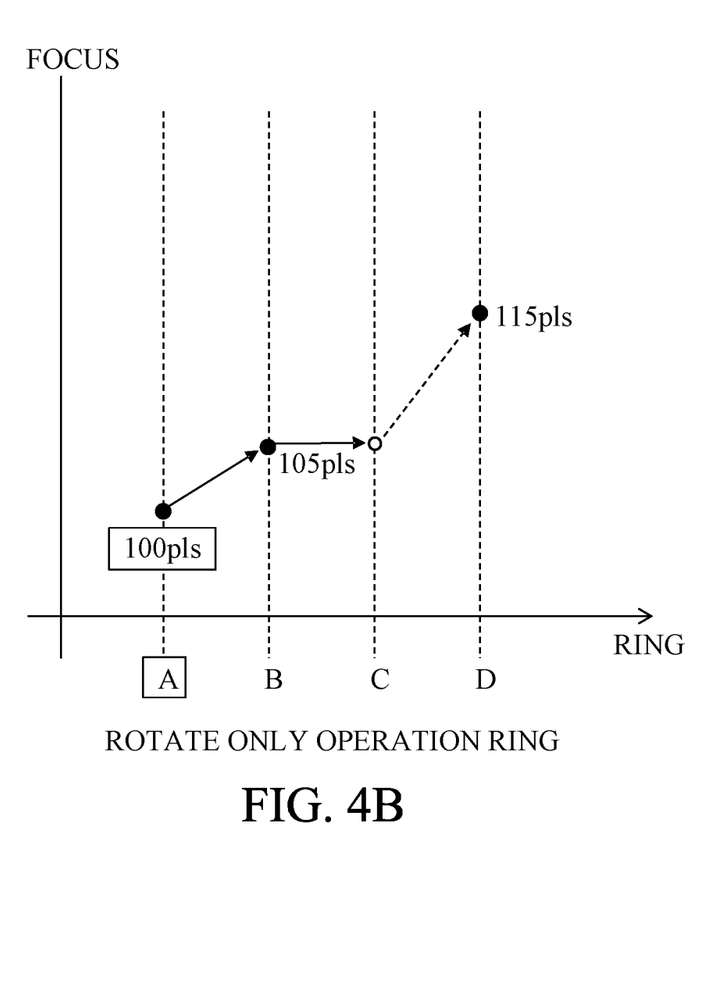

FIG. 4A illustrates illustrative abnormal driving of the focus lens 105 when the focus lens 105 moves while the focusing operation ring 115 is maintained unrotated. FIG. 4B illustrates the illustrative abnormal driving of the focus lens 105 when the focusing operation ring 115 moves while the focus lens 105 is maintained fixed. In these figures, the abscissa axis represents the ring position and the ordinate axis represents the focus position.

In FIG. 4A, at the ring position C, only the focus lens 105 is moved to the position of 200 pls by the external force, so that the correspondence relationship between the ring position and the focus position destroys. When the focusing operation ring 115 is operated from this state to the ring position D, the focus lens 105 is driven to the target focus position (115 pls) corresponding to the ring position D in a direction that does not correspond to the rotation direction of the focusing operation ring 115.

In FIG. 4B, manual focusing is prohibited when the focusing operation ring 115 is operated to the ring position B and the focus lens 105 cannot be driven from the position (105 pls) at that time. In this state, even when the focusing operation ring 115 rotates to the ring position C, the focus lens 105 does not move. Thereafter, when the focus lens 105 is allowed to be drivable and is operated to the ring position D, the focus lens 105 is driven largely to the target focus position (115 pls) corresponding to the ring position D.

Thus, when the drive control of the focus lens 105 in accordance with the operation of the focusing operation ring 115 is continued while the correspondence relationship between the ring position and the focus position destroys, the abnormal driving occurs such as the operating direction of the focusing operation ring 115 inverted to the driving direction of the focus lens 105 and a sudden increase of the focus drive amount.

Accordingly, the lens microcomputer 113 according to this embodiment updates the ring reference position and the focus reference position when the operation of the focusing operation ring 115 starts. Thereby, when the operation of the focusing operation ring 115 starts, the correspondence relationship between the ring position and the focus position is revived and the abnormal driving of the focus lens 105 is prevented in the subsequent operation of the focusing operation ring 115.

Whether the operation of the focusing operation ring 115 starts is determined based on the change in the detected ring position. When the ring position does not change for a predetermined time, it can be determined that the focusing operation ring 115 is not operated. When the ring position changes from the unchanged ring position, it can be determined that the operation of the focusing operation ring 115 starts. When the start of the operation of the focusing operation ring 115 is thus detected, the lens microcomputer 113 updates the ring reference position and the focus reference position.

Even when the focusing operation ring 115 located at the end position in the drivable range (referred to as a driving limit position hereinafter) is attempted to be operated toward the outside of the drivable range, the focus lens 105 is not driven. Thus, the correspondence between the ring position and the focus position destroys. In this case, the correspondence relationship between the ring position and the focus position can be maintained by setting the ring reference position to the current ring position and by updating the focus reference position to the driving limit position.

Figure 5:
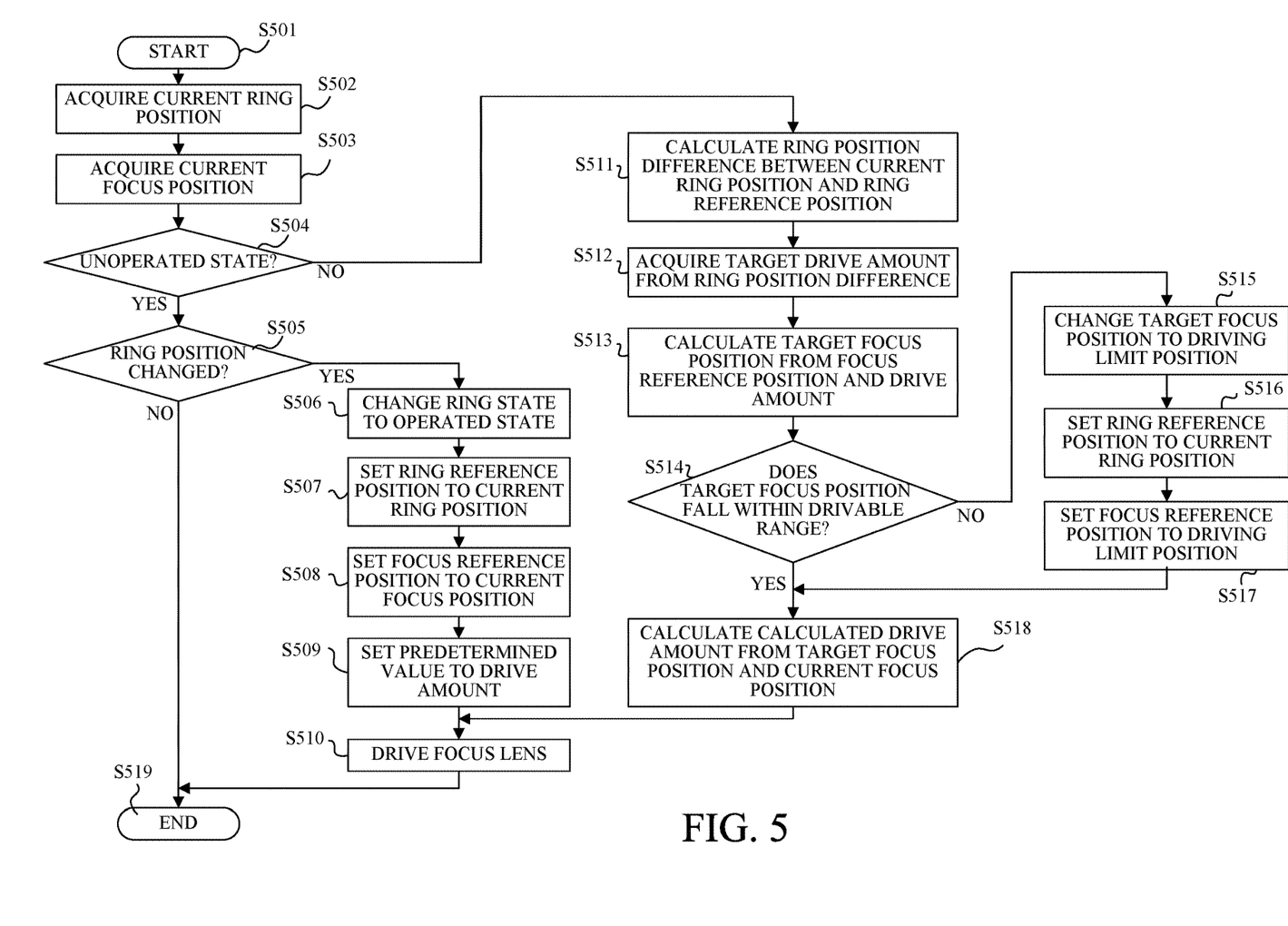
FIG. 5 is a flowchart illustrating processing according to the first embodiment.

A flowchart in FIG. 5 illustrates processing performed by the lens microcomputer 113 in this embodiment. The lens microcomputer 113 executes this processing in accordance with a computer program. In the following description, S stands for the step. The lens microcomputer 113 corresponds to a control apparatus including an operation start detector and a drive controller.

The lens microcomputer 113 that has started this processing at S501 acquires the current ring position at S502 and acquires the current focus position at S503.

At S504, the lens microcomputer 113 determines whether the focusing operation ring 115 is in an unoperated state. If the focusing operation ring 115 is unoperated state in which the focusing operation ring 115 is not operated, the lens microcomputer 113 proceeds to S505. If it is in an operated state in which the focusing operation ring 115 is operated, the lens microcomputer 113 proceeds to S511.

At S505, the lens microcomputer 113 compares the ring position acquired at the last control timing with the ring position acquired at the current (present) control timing, and determines whether or not the ring position has changed since the last control timing. When the ring position does not change, the lens microcomputer 113 proceeds to S519 and ends this processing. On the other hand, when the ring position changes, the flow proceeds to S506.

At S506, the lens microcomputer 113 considers that the operation of the focusing operation ring 115 has started, and changes the state (ring state) of the focusing operation ring 115 to the operated state.

At step S507, the lens microcomputer 113 stores the current ring position in the internal memory and sets it to the ring reference position. At S508, the lens microcomputer 113 stores the current focus position as the focus reference position. At this stage, since the current ring position and the current focus position are the ring and focus reference positions, the focus drive amount cannot be calculated based on these reference positions.

Hence, at S509, the lens microcomputer 113 sets a predetermined value to the calculated focus drive amount. Thereafter, the lens microcomputer 113 drives the focus lens 105 in accordance with the set calculated focus drive amount at S510.

When the flow proceeds to S511 after the operated state is determined at S504, the ring reference position and the focus reference position have already been set (stored in the internal memory). At S511, the lens microcomputer 113 calculates a difference from the ring reference position to the current ring position after the ring reference position is set (stored), or the total ring operational amount up to now.

Next, at S512, the lens microcomputer 113 acquires a target focus drive amount corresponding to the total ring operational amount calculated at S511. The method of acquiring the target focus drive amount is as described above.

Next, at S513, the lens microcomputer 113 calculates the target focus position by adding the focus reference position and the target focus drive amount acquired at S512 to each other.

Next, at S514, the lens microcomputer 113 determines whether the target focus position calculated at S513 falls within the drivable range of the focus lens 105. If the target focus position falls within the drivable range of the focus lens 105, the lens microcomputer 113 proceeds to S518, and if not, the flow proceeds to S515.

At S518, the lens microcomputer 113 calculates the calculated focus drive amount as the difference between the target focus position and the current focus position. Thereafter, the lens microcomputer 113 proceeds to S510.

On the other hand, at S515, the lens microcomputer 113 changes the target focus position to the driving limit position of the focus lens 105. Thereafter, at S516, the lens microcomputer 113 updates the ring reference position to the current ring position. Then, at S517, the focus reference position is updated to the driving limit position, and after S518 and S510, the flow ends at S519.

The ring reference position and the focus reference position may not be updated when the operation of the focusing operation ring 115 starts or when the focus lens 105 reaches the driving limit position. For example, it may be performed after the drive control of the focus lens 105 is completed such as autofocusing (AF).

This embodiment can improve the driving position accuracy of the focus lens 105 relative to the rotational position of the endlessly rotatable focusing operation ring 115.

Second Embodiment

The first embodiment discusses updating the ring and focus reference positions when the operation of the focusing operation ring 115 starts. However, when the operational velocity of the focusing operation ring 115 is low and the ring position gently changes, a transition (operation start) from the unoperated state to the operated state of the focusing operation ring 115 may be incorrectly determined during the operation. This incorrect determination would accordingly update the ring reference position and the focus reference position. In other words, the ring reference position and the focus reference position are updated while the focusing operation ring 115 is being operated or driven, and the correspondence relationship between the updated ring reference position and the updated focus reference position may shift from the original correspondence relationship when the operation starts. Accordingly, when the focusing operation ring 115 is operated at a low speed, it is necessary to prevent the ring reference position and the focus reference position from being updated.

Hence, the stop determination time as the time length used to determine that the focusing operation ring 115 has stopped may be changed in accordance with the operational velocity of the focusing operation ring 115. In other words, by making longer the stop determination time as the operational velocity of the focusing operation ring 115 is lower, the transition from the unoperated state to the operated state can be prevented from being determined while the focusing operation ring 115 is being operated. Thereby, the ring reference position and the focus reference position can be prevented from being updated while the focusing operation ring 115 is being operated.

Third Embodiment

When the operational direction of the focusing operation ring 115 is reversed, the focusing operation ring 115 stops rotating and starts rotating at the moment of the reversal, so that the operation start of the focusing operation ring 115 is determined and the ring reference position and the focus reference position are updated. If the operation of the focusing operation ring 115 is suddenly reversed, the focus lens 105 cannot be driven in time and the ring reference position and the focus reference position may be updated while the focus lens 105 is being driven. As a result, the correspondence relationship between the updated ring reference position and the focus reference position shifts from the original correspondence relationship. It is thus necessary to prevent the ring reference position and the focus reference position from being updated in the sudden reverse operation of the focusing operation ring 115.

Hence, a change amount (decrease amount) in the operational velocity of the focusing operation ring 115 larger than a predetermined amount may be considered to be a precursor of the sudden reverse operation of the focusing operation ring 115 and the stop determination time for the focusing operation ring 115 may be set long. Since it is not determined that the focusing operation ring 115 has stopped as soon as the operational direction of the focusing operation ring 115 is reversed, the ring reference position and the focus reference position can be prevented from being updated. Thereby, the ring reference position and the focus reference position before and after the operation of the focusing operation ring 115 is reversed can be maintained. Even when the sudden reverse operation returns the focusing operation ring 115 to the ring position before the reverse operation, the focus lens 105 can be returned to the focus position before the reverse operation.

Fourth Embodiment

Even when the focusing operation ring 115 is operated at a low speed, a driving velocity of the focus lens 105 increases when the drive amount of the focus lens 105 to the unit operational amount of the focusing operation ring 115 (referred to as a focusing operation sensitivity hereinafter) is large. In this case, similar to the second embodiment, in order to prevent the ring reference position and the focus reference position from being updated while the focusing operation ring 115 is being operated (or driven), the stop determination time of the focusing operation ring 115 needs to be set long.

However, an excessively long stop determination time makes long a time lag from when the operation of the focusing operation ring 115 is actually stopped to when it is determined that the operation is stopped. Hence, the stop determination time may be set short when the focusing operation sensitivity is low.

Where the focusing operation ring 115 is an electronic ring, the focusing operation sensitivity can be easily changed by electrical setting. When the stop determination time is uniform irrespective of the focusing operation sensitivity, the stop determination time becomes excessively short or long relative to the focusing operation sensitivity, causing inconvenience. The stop determination time may be properly set in accordance with the focusing operation sensitivity.

While each of the above embodiments describes the optical element as the focus lens 105, the optical element may be an optical element other than the focus lens, such as a movable zoom lens or a diaphragm including movable aperture blades.

Each of the above embodiments has described the lens microcomputer 113 in the interchangeable lens 116 serving as the operation start detector and the drive controller. Nevertheless, the camera microcomputer included in the camera body as the imaging apparatus may serve as the control apparatus including the operation start detector and the drive controller. In this case, the camera microcomputer acquires information on the ring position and the focus position from the lens microcomputer through communications.

Each of the above embodiments can improve the driving accuracy of the optical element relative to the rotational position of the endlessly rotatable operation ring.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processor (CPU), micro processor (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-72669, filed on Apr. 4, 2018, which is hereby incorporated by reference herein in its entirety.

What is claimed is:

1. A control apparatus used for an optical apparatus that includes a movable optical element, an operation ring that is endlessly rotatable, and a driver configured to drive the optical element, the control apparatus comprising:
    an operation start detector configured to detect a start of an operation of the operation ring; and
    a drive controller configured to control the driver,
    wherein the drive controller sets a rotational position of the operation ring and a position of the optical element to a ring reference position and an optical element reference position respectively when the start of the operation of the operation ring is detected,
    wherein the drive controller controls the driver in accordance with a drive amount of the optical element calculated with an operational amount of the operation ring from the ring reference position, and the optical element reference position, and
    wherein the drive controller calculates a target position of the optical element using the operational amount of the operation ring and the optical element reference position, and calculates the drive amount based on the target position and the position of the optical element.

2. The control apparatus according to claim 1, wherein the drive controller acquires the operational amount of the operation ring and the position of the optical element at each control timing of a predetermined period, and
    wherein the drive controller sets the target position of the optical element using the operational amount of the operation ring and the optical element reference position at each control timing, and calculates the drive amount based on the target position and the position of the optical element.

3. The control apparatus according to claim 1, wherein the drive controller updates the ring reference position and the optical element reference position when the optical element is located at an end position in a drivable range of the optical element.

4. The control apparatus according to claim 1, wherein the optical element is a focus lens configured to move in focusing.

5. The control apparatus according to claim 1, wherein the optical element is a zoom lens configured to move in zooming.

6. The control apparatus according to claim 1, wherein the optical element is an aperture stop.

7. The control apparatus according to claim 1, wherein the operation start detector detects the start of the operation of the operation ring when an unoperated state in which the rotational position of the operation ring is fixed changes to an operated state in which the rotational position changes.

8. The control apparatus according to claim 7, wherein the operation start detector acquires an operational velocity of the operation ring, and changes a time length used to determine, based on the operational velocity, whether or not the operation ring is in the unoperated state.

9. The control apparatus according to claim 7, wherein the operation start detector acquires a change amount in an operational velocity of the operation ring, and changes a time length used to determine, based on the change amount in the operational velocity, whether or not the operation ring is in the unoperated state.

10. The control apparatus according to claim 7, wherein the operation start detector acquires an operation sensitivity as the drive amount of the optical element by the driver to a unit operational amount of the operation ring, and changes a time length used to determine, based on the operation sensitivity, whether or not the operation ring is in the unoperated state.

11. An optical apparatus comprising:
    a movable optical element;
    an operation ring that is endlessly rotatable;
    a driver configured to drive the optical element; and
    a control apparatus including an operation start detector configured to detect a start of an operation of the operation ring, and a drive controller configured to control the driver,
    wherein the drive controller sets a rotational position of the operation ring and a position of the optical element to a ring reference position and an optical element reference position respectively when the start of the operation of the operation ring is detected,
    wherein the drive controller controls the driver in accordance with a drive amount of the optical element calculated with an operational amount of the operation ring from the ring reference position, and the optical element reference position, and
    wherein the drive controller calculates a target position of the optical element using the operational amount of the operation ring and the optical element reference position, and calculates the drive amount based on the target position and the position of the optical element.

12. An imaging apparatus to which an optical apparatus is detachably attached, the optical apparatus including a movable optical element, an operation ring that is endlessly rotatable, and a driver configured to drive the optical element, the imaging apparatus comprising:
    an image sensor configured to convert an object image into an electric signal; and
    the control apparatus according to claim 1.

13. A control method for an optical apparatus that includes a movable optical element, an operation ring that is endlessly rotatable, and a driver configured to drive the optical element, the control method comprising the steps of:
    acquiring a rotational position of the operation ring and a position of the optical element when a start of an operation of the operation ring is detected;
    setting an acquired rotational position of the operation ring and an acquired position of the optical element to a ring reference position and an optical element reference position respectively;
    acquiring an operational amount of the operation ring from the ring reference position after the setting step;
    calculating a target position of the optical element using the operational amount of the operation ring and the optical element reference position;
    calculating a drive amount of the optical element based on the target position and the position of the optical element; and
    controlling the optical element based on a calculated drive amount of the optical element.

* * * * *